3,115,496
CERTAIN 3,4-DISUBSTITUTED - 1,2,5 - THIA-
DIAZOLE - 1,1 - DIOXIDES AND THEIR
PREPARATION
John B. Wright, Kalamazoo Township, Kalamazoo
County, Mich., assignor to The Upjohn Company,
Kalamazoo, Mich., a corporation of Delaware
No Drawing. Filed May 13, 1963, Ser. No. 280,115
9 Claims. (Cl. 260—301)

This invention pertains to novel organic compounds and to a process for preparing the same. More particularly, the invention is directed to novel 3,4-disubstituted-1,2,5-thiadiazole-1,1-dioxides and to a process for preparing them. The novel compounds of the invention can be represented by the following structural formula

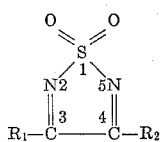

I wherein $R_1$ and $R_2$ are selected from the group consisting of lower-alkyl of from 1 to 4 carbon atoms, inclusive, phenyl, and substituted phenyl of the formula

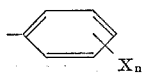

II wherein X is selected from the group consisting of lower-alkyl as defined above, lower-alkoxy of from 1 to 4 carbon atoms, inclusive, and halogen; and $n$ is an integer from 1 to 4, inclusive.

In accordance with this invention, lower-alkyl of from 1 to 4 carbon atoms includes methyl, ethyl, propyl, butyl, and isomeric forms thereof. Similarly, lower-alkoxy of from 1 to 4 carbon atoms includes methoxy, ethoxy, propoxy, butoxy, and isomeric forms thereof. Halogen includes chlorine, bromine, iodine, and fluorine.

The novel compounds of this invention (compounds of Formula I, above) are local anti-inflammatory agents and can be used for treating cuts, burns, abrasions, and contusions in mammals, birds, and other animals.

The novel compounds of Formula I are also useful as intermediates. For example, they can be catalytically hydrogenated in the presence of a hydrogenation catalyst, e.g., platinum or palladium, to obtain the corresponding 3,4-disubstituted-1,2,5-thiadiazolidine-1,1-dioxides of the formula

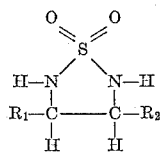

III wherein $R_1$ and $R_2$ are as defined above. The compounds of Formula III can be reacted with chlorine to produce active-chlorine compounds in which one or both of the N-attached hydrogen atoms are replaced by chlorine, depending on whether chlorination of the Formula III compounds is effected with one molecular equivalent of chlorine or with two molecular equivalents. These active-chlorine compounds are useful as disinfectants, bleaching agents, and antiseptics.

The novel compounds of Formula I are prepared by condensing sulfamide with an α-diketone of the formula

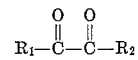

wherein $R_1$ and $R_2$ are as defined above. The reactants are mixed in the presence of an inert organic solvent and a catalyst. Suitable inert organic solvents include methanol, ethanol, isopropyl alcohol, ethanol and water, dioxane, dimethylformamide, dioxane and water, dimethylformamide and water, and the like. Suitable catalysts include acid catalysts, for example, hydrogen chloride, sulfuric acid, p-toluenesulfonic acid, hydrogen bromide, and the like; and basic catalysts, for example, triethylamine, N,N-dimethylaniline, N-methylpiperidine, N-methylmorpholine, and the like. The reaction proceeds satisfactorily at temperatures ranging from about 20° C. up to about 100° C., and, advantageously, the reaction mixture is heated at a temperature in the range of about 60° C. up to about 100° C. in order to assure completion of the reaction in a convenient interval of time. The 3,4-disubstituted-1,2,5-thiadiazole-1,1-dioxide is separated from the reaction mixture and recovered in pure form by conventional procedures such as filtration, solvent evaporation, solvent extration, and crystallization.

The α-diketone starting compounds having the formula

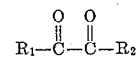

are generally known in the art and can be prepared by known methods. Illustrative known α-diketones include diacetyl (2,3-butanedione),
2,3-pentanedione,
4-methyl-2,3-pentanedione,
2,3-hexanedione,
5-methyl-2,3-hexanedione,
3,4-hexanedione,
2,5-dimethyl-3,4-hexanedione,
2,2,5,5-tetramethyl-3,4-hexane-dione,
2,3-heptanedione,
3,4-heptanedione,
3,4-octanedione,
4,5-octanedione,
3,6-dimethyl-4,5-octanedione,
5,6-decanedione,
4,5-nonanedione,
1-phenyl-1,2-propanedione,
1-(p-bromophenyl)-1,2-propanedione,
1-(m-bromophenyl)-1,2-propanedione,
1-(o-bromophenyl)-1,2-propanedione,
1-(p-methoxyphenyl)-1,2-propanedione,
1-phenyl-1,2-butanedione,
1-phenyl-1,2-pentanedione,
1-(3-chloro-4-methoxyphenyl)-1,2-propanedione,
1-(3,4-xylyl)-1,2-propanedione,
1-(o-chlorophenyl)-1,2-propanedione,
1-(m-chlorophenyl)-1,2-propanedione,
1-(p-chlorophenyl)-1,2-propanedione,
1-(2,5-diethoxyphenyl)-1,2-propanedione,
1-(3,4-diethoxyphenyl)-1,2-propanedione,
1-(2,5-dimethoxyphenyl)-1,2-propanedione,
1-(3,4-dimethoxyphenyl)-1,2-propanedione,
1-(o-fluorophenyl)-1,2-propanedione,
1-(m-fluorophenyl)-1,2-propanedione,
1-(p-fluorophenyl)-1,2-propanedione,
1-mesityl-1,2-propanedione,
1-(2-methoxy-p-tolyl)-1,2-propanedione,
1-(4-methoxy-m-tolyl)-1,2-propanedione, 1-(4-methoxy-o-tolyl)-1,2-propanedione,
1-(6-methoxy-m-tolyl)-1,2-propanedione,
1-(3,4-diethoxyphenyl)-1,2-butanedione,
1-(3,4-dimethoxyphenyl)-1,2-butanedione,
1-(p-methoxyphenyl)-1,2-butanedione,
1-(3,4-diethoxyphenyl)-1,2-pentanedione,
1-(p-tolyl)-1,2-propanedione,
1-(3,4,5-trimethoxyphenyl)-1,2-propanedione,
3,3-dimethyl-1-phenyl-1,2-butanedione,
3,3-dimethyl-1-(p-tolyl)-1,2-butanedione,
3,3-dimethyl-1-(2,4-xylyl)-1,2-butanedione,
1-phenyl-1,2-hexanedione,
benzil,
3-bromo-2,4,6-trimethylbenzil,
4-butoxybenzil,
2-chlorobenzil,
3-chlorobenzil,
4-chlorobenzil,
4,4'-dibromobenzil,
4,4'-dibutoxybenzil,
2,2'-dichlorobenzil,
4,4'-dichlorobenzil,
2,2'-diethoxybenzil,
3,3'-diethoxybenzil,
4,4'-diethoxybenzil,
2,5-diethoxybenzil,
3,4-diethoxybenzil,
4,4'-diisopropylbenzil,
2,2'-dimethoxybenzil,
3,3'-dimethoxybenzil,
p-anisil(4,4'-dimethoxybenzil),
2,2'-dimethylbenzil,
p-tolil(4,4'-dimethylbenzil),
2-ethoxybenzil,
4-ethoxybenzil,
2,2',4,4',6,6'-hexaethylbenzil,
2,2',4,4',6,6'-hexaisopropylbenzil,
2,2',4,4',5,5'-hexamethylbenzil,
2,2',4,4',6,6'-hexamethylbenzil,
4-isobutoxybenzil,
4-isopropoxybenzil,
2-methoxybenzil,
3-methoxybenzil,
4-methoxybenzil,
4-methoxy-2,6-dimethylbenzil,
4-methylbenzil,
2,2',3,3',4,4',6,6'-octamethylbenzil,
2,2',3,3',5,5',6,6'-octamethylbenzil,
2,2',4,4',6-pentamethylbenzil,
4-propoxybenzil,
3,3',5,5'-tetrabromo-4,4'-dichlorobenzil,
2,2',4,4'-tetraethoxybenzil,
3,3',4,4'-tetraethoxybenzil,
2,2',3,3'-tetramethoxybenzil,
2,2',4,4'-tetramethoxybenzil,
3,3',4,4'-tetramethoxybenzil,
2,2',3,3'-tetramethylbenzil,
2,2',4,4'-tetramethylbenzil,
2,2',5,5'-tetramethylbenzil,
3,3',4,4'-tetramethylbenzil,
3,3',5,5'-tetramethylbenzil,
2,3,4,6-tetramethylbenzil,
2,3,5,6-tetramethylbenzil,
2,4,4',6-tetramethylbenzil,
2,4,6-triethylbenzil,
2,4,6-trimethylbenzil,
5,5'-dibromo-2,2'-dimethoxybenzil,
3,3'-dichloro-2,2'-dimethoxybenzil,
4,4'-dichloro-2,2'-dimethoxybenzil,
5,5'-dichloro-2,2'-dimethoxybenzil,
4,4'-dichloro-3,3'-dimethoxybenzil,
2,2'-diethyl-3,3'-dimethoxybenzil, and
3,3'-diisopropoxy-4,4'-dimethoxybenzil.

The following examples are illustrative of the process and products of the present invention, but are not to be construed as limiting.

*Example 1.—Preparation of 3,4-Dimethyl-1,2,5-Thiadiazole-1,1-Dioxide*

A mixture consisting of 4.8 g. (0.05 mole) of sulfamide, 10 ml. of ethanol, and 4.3 g. (0.05 mole) of diacetyl (2,3-butanedione) was treated with a small amount of dry hydrogen chloride gas. The temperature of the reaction mixture increased to about 60° to 70° C., and heating, at this temperature, was continued for 2 hrs. The reaction mixture was diluted with boiling ethanol until a homogeneous solution was obtained, and the solution was set aside overnight. After removing the ethanol under reduced pressure, the residue was triturated with 10 ml. of water and filtered. The filter cake was dissolved in hot ethanol, the solution was set aside, and later, the precipitated solid that settled out was removed by filtration. The filtrate was evaporated to dryness and the 3.24 g. of material thus obtained was triturated with ether. After removing the ether and recrystallizing from isopropyl alcohol, there was obtained 3,4-dimethyl-1,2,5-thiadiazole-1,1-dioxide having a melting point of 149° C. (with decomposition).

*Analysis.*—Calcd. for $C_4H_6N_2O_2S$: C, 32.87; H, 4.13; N, 19.17; S, 21.93. Found: C, 33.34; H, 3.49; N, 18.35; S, 21.48.

This compound, when tested in rats, was found to have anti-inflammatory activity.

Following the same procedure but substituting 3,4-hexanedione, 2,5-dimethyl-3,4-hexanedione, 2,3-heptanedione, and 5,6-decanedione for diacetyl, there were prepared 3,4-diethyl-, 3,4-diisopropyl-, 3-butyl-4-methyl-, and 3,4-dibutyl-1,2,5-thiadiazole-1,1-dioxides, respectively.

*Example 2.—Preparation of 3-Methyl-4-Phenyl-1,2,5-Thiadiazole-1,1-Dioxide*

A mixture consisting of 14.82 g. (0.1 mole) of 1-phenyl-1,2-propanedione, 9.6 g. (0.1 mole) of sulfamide, and 100 ml. of absolute ethanol was treated with anhydrous hydrogen chloride gas. An exothermic reaction ensued which increased the temperature of the reaction mixture to about 50° C. Heating at the reflux temperature was continued for 3 hrs., and the reaction mixture was then cooled and filtered. The filtrate was evaporated to dryness under reduced pressure, and the residue was washed with water and then with ether. There was thus obtained 6.1 g. of a white solid melting at 131° C. (with decomposition). Recrystallization from benzene gave 4.82 g. (23% yield) of 3-methyl-4-phenyl-1,2,5-thiadiazole-1,1-dioxide as slightly pink needles having a melting point of 135° C. (with decomposition).

*Analysis.*—Calcd. for $C_9H_8N_2O_2S$: C, 51.91; H, 3.87; S, 15.40. Found: C, 52.05; H, 3.64; S, 15.50.

This compound, when tested in rats, was found to have anti-inflammatory activity.

Following the same procedure but substituting 1-phenyl-1,2-pentanedione,
1-(p-bromophenyl)-1,2-propanedione,
1-(p-methoxyphenyl)-1,2-propanedione,
1-(3,4-dimethoxyphenyl)-1,2-propanedione,
1-(o-chlorophenyl)-1,2-propanedione,
1-(m-fluorophenyl)-1,2-propanedione,
1-mesityl-1,2-propanedione,
1-(3-chloro-4-methoxyphenyl)-1,2-propanedione,
1-(3,4,5-trimethoxyphenyl)-1,2-propanedione, and
3,3-dimethyl-1-(2,4-xylyl)-1,2-butanedione for 1-phenyl-1,2-propanedione, there were prepared 3-propyl-4-phenyl-,
3-methyl-4-(p-bromophenyl)-,
3-methyl-4-(p-methoxyphenyl)-,
3-methyl-4-(3,4-dimethoxyphenyl)-,
3-methyl-4-(o-chlorophenyl)-, 3-methyl-4-(m-fluorophenyl)-,
3-methyl-4-mesityl-,
3-(3-chloro-4-methoxyphenyl)-4-methyl-,
3-methyl-4-(3,4,5-trimethoxyphenyl)-, and
3-tert-butyl-4-(2,4-xylyl)-1,2,5-thiadiazole-1-dioxides, respectively.

*Example 3.—Preparation of 3,4-Di-(p-Tolyl)-1,2,5-Thiadiazole-1,1-Dioxide*

A mixture consisting of 0.96 g. (0.01 mole) of sulfamide, 2.38 g. (0.01 mole) of p-tolil (4,4'-dimethylbenzil), and 10 ml. of anhydrous ethanol was treated with anhydrous hydrogen chloride gas until the temperature of the reaction mixture had reached 50° C. Heating of the reaction mixture was continued at the reflux temperature for 2 hrs. After cooling and filtering, there was obtained 2.44 g. (82% yield) of 3,4-di-(p-tolyl)-1,2,5-thiadiazole-1,1-dioxide as pale yellow prisms having a melting point of 201° to 202° C. The compound was purified by recrystallization from methyl ethyl ketone, and had a melting point of 206° to 207° C.

*Analysis.*—Calcd. for $C_{16}H_{14}N_2O_2S$: C, 64.41; H, 4.73; N, 9.39; S, 10.75. Found: C, 64.45; H, 4.83; N, 9.08; S, 10.46.

This compound, when tested in rats, was found to have antiflammatory activity.

Following the same procedure but substituting 3-bromo-2,4,6-trimethylbenzil,
2,2'-dimethylbenzil,
2,2',4,4',6,6'-hexaethylbenzil,
2,2'4,4',6,6'-hexaisopropylbenzil, and
2,2',3,3',4,4',6,6'-octamethylbenzil for p-tolil, there were prepared 3-phenyl-4-(3-bromo-2,4,6-trimethylphenyl)-,
3,4-di-(o-tolyl)-,
3,4-di-(2,4,6-triethylphenyl)-,
3,4-di-(2,4,6-triisopropylphenyl)-, and
3,4-di(2,3,4,6-tetramethylphenyl)-1,2,5-thiadiazole-1,1-dioxides, respectively.

*Example 4.—Preparation of 3,4-Di-(p-Anisyl)-1,2,5-Thiadiazole-1,1-Dioxide*

A mixture consisting of 10.0 g. (0.037 mole) of p-anisil (4,4'-dimethoxybenzil), 3.75 g. (0.037 mole) of sulfamide, and 40 ml. of absolute ethanol was treated with anhydrous hydrogen chloride gas until the temperature had increased to 50° C. An additional 25 ml. of absolute ethanol was added, and heating of the reaction mixture at the reflux temperature was continued for 2½ hrs. After cooling and filtering, there was obtained 9.26 g. of crude product as yellow crystals melting at 155° to 175° C. Recrystallization from ethyl acetate gave yellow needles melting at 180° to 185° C. A second crop of crystals was recovered which had a melting point of 181° to 184° C. The two crops of crystals were combined and recrystallized from ethyl acetate to give 5.52 g. (45% yield) of 3,4-di-(p-anisyl)-1,2,5-thiadiazole-1,1-dioxide as yellow needles melting at 185° to 186° C.

*Analysis.*—Calcd. for $C_{16}H_{14}N_2O_4S$: C, 58.17; H, 4.27; N, 8.48; S, 9.71. Found: C, 58.31; H, 4.11; N, 8.41; S, 9.70.

This compound, when tested in rats, was found to have anti-inflammatory activity.

Following the same procedure but substituting 4-butoxybenzil, 2-chlorobenzil, 4,4'-dibromobenzil, 5,5'-dibromo-2,2',4,4'-tetramethoxybenzil, 4,4'-dibutoxybenzil, 2,2'-diethoxybenzil, 2,5-diethoxybenzil, 4-isobutoxybenzil, 2,2',4,4'-tetraethoxybenzil, and 3,3'-diisopropoxy-4,4'-dimethoxybenzil for p-anisil, there were prepared 3-(p-butoxyphenyl)-4-phenyl-, 3-(o-chlorophenyl)-4-phenyl-, 3,4-di-,(p-bromophenyl)-, 3,4-di-(5-bromo-2,4-dimethoxyphenyl)-, 3,4-di-(p-butoxyphenyl)-, 3,4-di-(o-ethoxyphenyl)- 3-(2,5-diethoxyphenyl)-4-phenyl-, 3-(p-isobutoxyphenyl)-4-phenyl-, 3,4-di-(2,4-diethoxyphenyl), and 3,4-di - (3 - isopropoxy - 4 - methoxyphenyl) - 1,2,5 - thiadiazole-1,1-dioxides, respectively.

*Example 5.—Preparation of 3,4-Diphenyl-1,2,5-Thiadiazole-1,1-Dioxide*

A mixture consisting of 105.0 g. (0.5 mole) of benzil, 48.0 g. (0.5 mole) of sulfamide, 20 ml. of triethylamine, and 1 liter of absolute ethanol was heated at the reflux temperature for 24 hrs. After evaporating the ethanol under reduced pressure, the residue was thoroughly washed first with ether and finally with water. There was thus obtained 68.5 g. of a tan solid melting at 247° to 248° C. The ether wash solution was evaporated to dryness and the residue was triturated with boiling ethanol. After removing the ethanol, the residue was again thoroughly washed with ether and finally stirred in 100 ml. of ether for 1 hr. There was thus obtained an additional 12.4 g. of a tan solid melting at 248° to 250° C. Recrystallization of the combined tan solids from acetone gave colorless prisms of 3,4-diphenyl-1,2,5-thiadiazole-1,1-dioxide having a melting point of 248° to 250° C.

*Analysis.*—Calcd. for $C_{14}H_{10}N_2O_2S$: C, 62.21; H, 3.73; N, 10.37; S, 11.86. Found: C, 61.90; H, 3.38; N, 10.11; E, 11.64.

This compound, when tested in rats, was found to have anti-inflammatory activity.

*Example 6.—Alternative Preparation of 3,4-Diphenyl-1,2,5-Thiadiazole-1,1-Dioxide*

A suspension of 10.51 g. (0.05 mole) of benzil in 50 ml. of dry ethanol was mixed with 4.8 g. (0.05 mole) of sulfamide, and a small amount of dry hydrogen chloride gas was bubbled into the reaction mixture. An exothermic reaction resulted which raised the temperature of the mixture to 50° to 60° C. Heating the reaction mixture at 60° C. was continued for 1 hr., and then it was heated at the reflux temperature before finally setting aside at room temperature for 2 days. Upon filtering the reaction mixture there was obtained 6.3 g. of 3,4-diphenyl-1,2,5-thiadiazole-1,1-dioxide having a melting point of 248° to 250° C., unchanged on recrystallization from acetone.

I claim:

1. 3,4-disubstituted-1,2,5-thiadiazole-1,1-dioxide of the formula

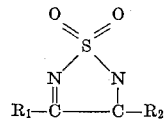

wherein $R_1$ and $R_2$ are selected from the group consisting of lower-alkyl, phenyl, and substituted phenyl of the formula

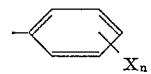

wherein X is selected from the group consisting of lower-alkyl, lower-alkoxy, and halogen, and $n$ is an integer from 1 to 4, inclusive.

2. 3,4-di-lower-alkyl-1,2,5-thiadiazole-1,1-dioxide.
3. 3,4-dimethyl-1,2,5-thiadiazole-1,1-dioxide.
4. 3 - lower - alkyl - 4 - phenyl - 1,2,5 - thiadiazole - 1,1-dioxide.
5. 3-methyl-4-phenyl-1,2,5-thiadiazole-1,1-dioxide.
6. 3,4-diphenyl-1,2,5-thiadiazole-1,1-dioxide.
7. 3,4-di-(p-tolyl)-1,2,5-thiadiazole-1,1-dioxide.
8. 3,4-di-(p-anisyl)-1,2,5-thiadiazole-1,1-dioxide.

9. The process which comprises reacting sulfamide with an α-diketone of the formula

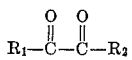

wherein $R_1$ and $R_2$ are selected from the group consisting of lower-alkyl, phenyl, and substituted phenyl of the formula

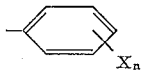

wherein X is selected from the group consisting of lower-alkyl, lower-alkoxy, and halogen, and $n$ is an integer from 1 to 4, inclusive, to produce a 3,4-disubstituted-1,2,5-thiadiazole-1,1-dioxide of the formula

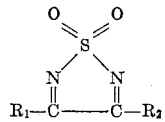

wherein $R_1$ and $R_2$ are as defined above.

No references cited.

UNITED STATES PATENT OFFICE
CERTIFICATE OF CORRECTION

Patent No. 3,115,496             December 24, 1963

John B. Wright

It is hereby certified that error appears in the above numbered patent requiring correction and that the said Letters Patent should read as corrected below.

Column 6, line 30, for "E, 11.64" read -- S, 11.64 --; lines 52 to 56, the formula should appear as shown below instead of as in the patent:

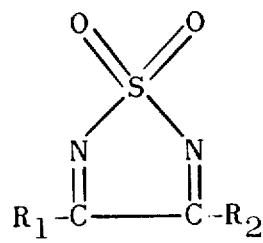

Signed and sealed this 26th day of May 1964.

(SEAL)
Attest:

ERNEST W. SWIDER             EDWARD J. BRENNER
Attesting Officer             Commissioner of Patents